(12) United States Patent  
Chen

(10) Patent No.: US 8,424,490 B2  
(45) Date of Patent: Apr. 23, 2013

(54) ANIMAL LITTER COMPOSITION

(76) Inventor: Joey Chen, Pasadena, CA (US)

( * ) Notice: Subject to any disclaimer, the term of this patent is extended or adjusted under 35 U.S.C. 154(b) by 0 days.

(21) Appl. No.: 13/068,585

(22) Filed: May 16, 2011

(65) Prior Publication Data

US 2011/0220031 A1      Sep. 15, 2011

Related U.S. Application Data

(63) Continuation of application No. 11/261,253, filed on Oct. 28, 2005, now Pat. No. 7,942,113.

(60) Provisional application No. 60/622,870, filed on Oct. 28, 2004.

(51) Int. Cl.  
*A01K 29/00*      (2006.01)

(52) U.S. Cl.  
USPC .......................................... 119/171

(58) Field of Classification Search .................. 119/171, 119/172, 173, 165, 169; 424/76.6  
See application file for complete search history.

(56) References Cited

U.S. PATENT DOCUMENTS

| | | | |
|---|---|---|---|
| 5,927,049 A * | 7/1999 | Simard ........................... 53/428 |
| 6,543,385 B2 * | 4/2003 | Raymond et al. ............. 119/171 |
| 7,343,874 B2 * | 3/2008 | DeLeeuw et al. ............. 119/171 |
| 2004/0051081 A1 * | 3/2004 | Moreton ................... 252/408.1 |
| 2005/0005870 A1 * | 1/2005 | Fritter et al. .................. 119/173 |

* cited by examiner

*Primary Examiner* — T. Nguyen  
(74) *Attorney, Agent, or Firm* — Philip Lee

(57) ABSTRACT

An animal litter mixture comprising pine wood and silica gel is provided. The pinewood is preferably a sawdust form, although the pinewood may be in the form of fine shavings or compressed pellets. The silica gel may have one porosity or a mixture of porosity. In one embodiment of the animal litter mixture, the silica gel may be an indicator gel that changes colors when the silica is saturated with water.

5 Claims, 1 Drawing Sheet

//ANIMAL LITTER COMPOSITION

This application is a continuation application of U.S. application Ser. No. 11/261,253, filed on 28 Oct. 2005 now U.S. Pat. No. 7,942,113, which application claims the benefit of U.S. Provisional Application 60/622,870 filed on 28 Oct. 2004, which provisional application is herein incorporated by reference.

BACKGROUND OF THE INVENTION

The present invention relates to animal litter and, more particularly, compositions for animal litter and methods of making animal litter.

Many different types of absorbant substances are used as animal litter including recycled newspaper, paper sludge, wheat, soybeans, ground corn cob granules, rice hulls, peanut hulls, sunflower hulls, cedar, sawdust and other organic materials. Clay, however, is the most common form of animal litter, e.g., used as cat litter, on the market making up to 80% to 90% of the litter market.

Clay based litter is available in either sand-like clumping or non-clumping gravel-like forms. Clumping clay litter contains sodium bentonite, a particularly absorbant type of clay (a gelling clay) which forms clumps after contacting animal urine and then can be scooped out of the litter pan to reduce odor from urine. More litter must be added to replace the litter that was thrown away. Advantageously, not all the litter has to be thrown away at the same time, and therefore it is economical, as less litter is needed.

In comparison, non-clumping litter does not form clumps when in contact with urine. The solid feces must be picked out and thrown away regularly but, at some point, the entire litter must be thrown out as urine accumulates at the bottom of the pan and the odor becomes objectionable over time. Because urine collects at the bottom of the pan, non-clumping clay litter does not last as long compared to clumping clay litter and non-clumping clay litter becomes objectionable more quickly, as it cannot be scooped out.

Clay-based animal litters present several disadvantages. Clays contain silica (silicon dioxide) dust that may be harmful to the health of animals, e.g., felines, and humans when inhaled. Prolonged inhalation of silica dust, which contains crystalline silica, can lead to silicosis, a respiratory disease caused by the inhalation of silica dust, which can cause scar formation within lung tissue and can obstruct the flow of oxygen into the lungs and bloodstream.

When clumping clay is used, the clumps formed by absorption of urine must be thrown out daily, in addition to removing the solid feces in the litter. The clumps may fall apart during removal and thus require some additional effort. With any clay based litter, odor is often objectionable after only a few days as urine pools at the bottom of the litter pan and causes the litter to stick to the pan. Use of clay also has some other disadvantages. Clay is a non-renewable resource usually obtained by stripping land and thus causing scarring of land. The U.S. Bureau of Mines estimates that in 1994, approximately 1.5 million metric tons of clay were mined to make absorbent cat litter and much of it was stripped mined. Clay is heavy and dense and as a result, lifting a litter pan filled with clay litter can be inconvenient or difficult for some individuals.

A major problem with clays and most other litter materials is the odor that is associated with ammonia present in urine. Urine is often coated over the outer surface of the litter material rather than absorbed within the material. As a result, the odor is volatilized into the air. The problem of odor emanating as a by-product of urine and fecal matter has been dealt with in many ways. Odor masking agents have been used to hide odors. See for example, U.S. Pat. Nos. 4,020,156 to Murray et. at and to U.S. Pat. No. 4,085,704 to Frazier. Both patents are herein incorporated by reference. Disadvantageously, the methods disclosed in these patents merely mask but do not eliminate the odor.

Another approach taken is to kill the microorganisms that create odors. This approach is taken in U.S. Pat. Nos. 4,607,594; 4,930443; 4,607,594; 5,005,520; and 5,507,205, all of which patents are herein incorporated by reference.

More recently, silica gel has been used as animal litter. See, for example, U.S. Pat. No. 5,970,915, which is herein incorporated by reference in its entirety. Silica gel can adsorb its weight in moisture and with some types of silica gel up to twice their weight. Silica gel adsorbs moisture from the urine, thereby helping to eliminate the odor produced by the presence of urine. Advantageously, silica gel may be flushed in small amounts and it will not clog septic systems.

A significant problem, however, with the use of silica gel is its relatively high cost compared to other types of litter material. It should be emphasized that silica gel does not contain the type of harmful silica found in clay. Instead, silica gel is an amorphous form that is essentially chemically inert and relatively non-toxic. Some animal litters use solely silica gel. Such a purely silica gel animal litter is relatively costly compared to other types of animal litters.

U.S. Pat. No. 6,578,521 to Raymond, et al., was granted for a litter composition comprising a mixture of absorbant material and silica gel. The '521 patent describes the use of clay and silica gel composition or mixture. A major disadvantage of a clay and silica gel animal litter is that it still employs clay. Absorbant clay is a non-renewable resource, which is mined, dried and ground to a desirable consistency. Clay contains crystalline silica which is a known carcinogen, according to the California EPA. Dust controlling agents are often added by the manufacturer to control the dust. Even with dust controlling agents added, it is nevertheless dusty and heavy, even at 50% weight of the total litter. Regardless of the weight mixture, any combination of silica gel and clay will be dusty and will be tracked on the animals feed and, moreover, breathing such dust whether silica gel or silica from the clay, into animal or human lungs is undesirable.

What is needed is a cat litter that is effective, economical, and yet safer to humans and animals than clay-based litters.

SUMMARY OF THE INVENTION

In one aspect, an animal litter mixture is provided, the mixture comprising: silica gel and pinewood. In a preferred embodiment, the pinewood is sawdust, although the pinewood may be other forms such as shavings or compressed pellets made from sawdust.

In one embodiment, the animal litter mixture may have silica gel in the mixture that is between 0.5% to 25% by weight of the total animal litter mixture. The pine wood material may be chosen from many of the common pines that are used for the home construction industry, e.g., white pine, yellow pine, ponderosa pine, sugar pine and white spruce.

In various embodiments of the animal litter mixture, the silica gel may be a type C silica gel, a type B silica gel or a mixture of both type B and C silica gel. The mixture of type B and C gels can provide different moisture adsorption characteristics.

The silica gel used in the animal litter mixtures may have color indicating characteristics. That is, when the silica gel has adsorbed sufficient water, i.e., becomes saturated, the silica gel turns a different color, e.g., blue to purple. A preferred type of indicator gel is an Orange Indicator Silica Gel.

While the sawdust aggregate particle size may range greatly, it is preferred that the sawdust have a largest dimension of between 1 and 3 millimeters. It is noted, however, that sawdust or pinewood particle size may be larger or smaller and is, regardless of particle size, within the scope of the present invention.

It is a feature of this invention to provide an animal litter that is less costly than 100% silica gel animal litter.

It is another feature of this invention to provide an animal litter that produces less dust than a purely clay litter or litter mixture of clay and silica gel;

It is another feature of this invention to provide an animal litter that is lighter for equivalent volume than a litter that is pure clay or a litter that is a mixture of clay and silica gel or essentially pure silica gel.

It is further a feature to provide an animal litter that is economic to produce, friendlier to the environment than litter having clay, is less toxic than a clay base litter and is safe to a septic system in small amounts.

DESCRIPTION OF THE PRESENTLY PREFERRED EMBODIMENTS

Figure 1:
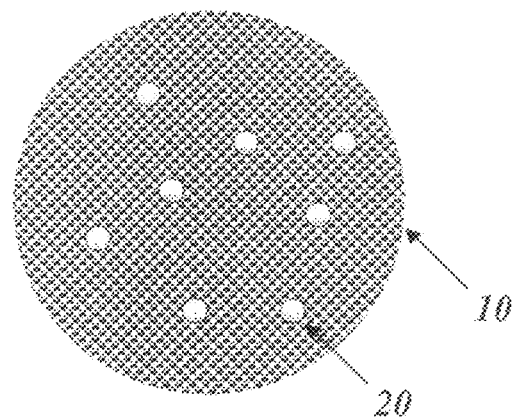
FIG. 1 shows an illustration of a mixture of animal litter based on pine sawdust and silica gel.

FIG. 1 shows a representation of animal litter, in accordance with an embodiment of the present invention. In a preferred embodiment, in accordance with the present invention, the animal litter is a combination mixture of pine wood 10 and silica gel 20. Preferably the pinewood 10 is in a sawdust form. However, the pine wood may also be in form of small wood shavings (not shown) or cylindrical pellets 30 or spherical pellets 40 which have been formed by compressing sawdust.

Silica gel 20 may be manufactured as a porous, amorphous form of silica ($SiO_2$). Silica gel is very different than other types of silica forms in that silica gel contains a network of microscopic pores. Silica gels can have pores having diameter ranges between about 5 Angstroms to about 3000 Angstroms. It is possible to produce silica gels in a wide variety of pore sizes. Common silica gel may have pore sizes ranging from about 60 Angstroms to about 125 Angstroms. Type A silica gels can have pore sizes that are less than about 20 Angstroms. Type B silica gels have pore sizes that range from about 20 Angstroms to about 100 Angstroms and Type C silica gels can have pore sizes that are greater than 100 Angstroms. Other ways of categorizing silica gels include "narrow pore" silica gels (average pore size about 20 Angstroms) and "wide pore" (average pore size about 110 Angstroms and greater). "Large pore" silica gel can have pore diameters that range from about 300 Angstroms to about 1000 Angstroms.

Narrow pore and wide pore silica can act differently with liquid water. Liquid water can destroy narrow pore silica gels but wide pore silica gels are not affected. Silica gel adsorb moisture due to van der Waals interactions and capillary condensation. Certain grades of silica can adsorb up to 1.2 times their own weight in water.

Silica gel can also be made with a Blue Silica Gel which changes colors depending on the level of adsorbed water. This type of indicator gel may be produced by combining Narrow Pore Silica gel (pore diameter: 2-3 nanometers with surface area less than or equal to 600 $m^2$/g of gel) with chloride cobalt ($CoCl_2$). As water is adsorbed, the color of the gel changes from blue to purple. Another type of silica gel is an Orange Silica Gel Indicator. The main advantage is that the Orange Silica Gel is believed to be less toxic than the cobalt laden Blue Silica gel.

The use of pine wood for animal litter has been known for many years. For example, pinewood shavings or sawdust, alone, has been used as animal litter. Wood shavings have been used for a long time as absorbent and odor minimizing bedding material for various animals, including hamsters, mice, and guinea pigs.

Wood material has been recently used as cat litter. For example, one company, Pine Fresh, uses kiln dried recycled pine wood. The advantages touted is that it is renewable, not toxic to animal or humans, and is relatively dust free and can be flushed in small amounts into city sewage. Wood as absorbent material may come in at least three forms, ground up sawdust, sawdust formed into pellets, and small wood shavings. The pelletized form can absorb many times its weight in urine and grows in size. U.S. Pat. No. 5,927,049 provides a method of processing yellow pine wood into a pelletized form to be used, by itself, for animal litter. While the pelletized form is compact compared to a sawdust form, the disadvantage of the pelletize form is that it is costlier than the other forms, e.g., shavings, or sawdust since the formation of pellets requires additional processing. Pine wood sawdust, such as those produced as waste material from producing lumber for building woods, e.g., two-by-fours, are preferred woods for use as litter material. Pine is relatively low in cost. Pine wood naturally absorbs many times it weight in urine and neutralizes ammonia.

Many different types of pine may be used, in accordance with the present invention. Some types of pines that may be used include white pine, yellow pine, ponderosa pine, sugar pine, among others. Pine wood is a good material for use as animal litter because it contains aromatic oils that neutralize the ammonia in animal urine, such as highly concentrated cat urine, and can effectively reduce odor. Pine sawdust by itself, when used, for example with cats, can last approximately two weeks before the odor becomes so strong and offensive that the sawdust must be tossed out.

In accordance with the present invention, it has been discovered that a mixture of pine sawdust and silica gel provides results that are superior to using pine sawdust or silica gel alone. Surprisingly, combining pine wood with the dessicant properties of silica gel results in an improved animal litter that lasts much longer than pine wood by itself. A small amount of silica gel mixed with the pine wood, preferably in sawdust form, can effectively lengthen the useful life of pinewood litter by at least twice the duration, e.g., about a month or even more, when used as animal litter such as cat litter. The combination pine wood sawdust and silica gel (a) quickly absorbs urine (b) neutralizes odors from urine and fecal waste and (c) can be advantageously flushed into a septic tank in small amounts or even can be safely used in compost. The combination pine wood sawdust and silica gel mixture is economical to manufacture since most of the mixture is pine wood sawdust which is relatively inexpensive.

In one embodiment of the present invention, the silica gel used in the pine sawdust silica gel mixture is an indicator gel. It may be possible to use Blue Silica Gel in some mixtures. More preferably, however, a silica gel having an orange indicator is preferred. It will be understood that the concept of using an indicator color incorporated into the silica gel to indicate saturation of water within the silica gel, as used in combination with a pine sawdust and silica gel mixture, comes within the scope of the present invention.

The following provides some examples of the combination pine wood and silica gel animal litter mixtures, in accordance with the present invention.

EXAMPLE 1

Type C silica gel mixed with a pine wood sawdust. The silica gel represents between about 1 to 25% by weight of the total weight of the animal litter.

EXAMPLE 2

Same mixture of Example 1 above, except the silica gel incorporates an indicator color, e.g., an Orange Silica Gel.

EXAMPLE 3

Type B and C silica gel, mixed with a pine wood sawdust. The type B silica gel makes ups about 50% of the total silica gel weight and the type C silica gel makes up about 50% of the total silica gel weight. The total silica gel weight is between 5 to 25% by weight of the mixture of the total weight of the animal litter.

EXAMPLE 4

Same mixture as Example 3, except that the Type B gel incorporates an indicator color, e.g., an Orange silica gel.

EXAMPLE 5

Same mixture as Example 3, except that the Type C gel incorporates an indicator color, e.g., an Orange silica gel.

EXAMPLE 6

Figure 2:
FIG. 2 shows an illustration of a cylindrical shaped wood pellet and a spherical shaped wood pellet.

Same as previous examples except using pine wood shavings or compressed pinewood pellets are used, instead of pinewood sawdust. The compressed pellets, of embodiments shown in FIG. 2, can be at least 1 millimeter across the largest dimension. In this example the pellet may be between about 1 to about 7 millimeters across the largest dimension and may be cylindrical 30 or spherical 40 in shape.

Our animal use tests have indicated that the combination is more effective than using pine sawdust alone and has better odor neutralizing properties than pure silica gel. Furthermore, one embodiment of the invention comprising pine wood (in sawdust form) and silica gel, is superior to a mixture of absorbant clay and silica gel as taught in U.S. Pat. No. 6,578,521. It is believed that use of dried pinewood provides (1) water absorption and (2) a natural, anti-bacterial agent, which reduces bacteria produced odor and (3) a natural chemical agent to neutralize urine. In addition, the silica gel provides added water adsorption into micropores and, moreover, (4) provides a vehicle for a water saturation indicator. In addition, it has been discovered that the pinewood and silica gel, helps control odor better than a pure silica gel litter, a pure clay litter or for that matter, a mixture of clay and silica gel.

A pine wood and silica gel mixture is further advantageous compared to clay because a mixture of pine wood and silica gel avoids using clay, which contains harmful silica dust. In addition, the pine wood sawdust and silica gel mixture is lighter per volume of animal litter mixture than a clay-silica gel litter mixture. Avoiding the use of non-renewable absorbant clay and using a renewable pinewood sawdust is also better for the environment. In addition, a pinewood and silica gel mixture is less dusty than an animal litter mixture of pure clay or a mixture of clay and silica gel.

The invention has been described in terms of exemplary embodiments. The invention, however, is not limited to the embodiments depicted and described and it is contemplated that other embodiments, which may be readily devised by persons of ordinary skill in the art, based on the teachings set forth, are within the scope of the invention.

What is claimed is:

1. An animal litter mixture, comprising:
   silica gel; and
   pine wood,
   wherein the pine wood is in the form of compressed pellets;
   wherein the silica gel is a mixture of type B and type C silica gel and the type B silica gel has medium pores between about 20 to 100 Angstroms and the type C silica gel has large pores that are greater than 100 Angstroms; and
   wherein the silica gel and the compressed pellets are not physically attached to each other in order to form the mixture.

2. The animal litter mixture of claim 1, wherein the pine wood is chosen from the group consisting of white pine, yellow pine, ponderosa pine, sugar pine and white spruce.

3. The animal litter mixture of claim 1, wherein the pellet is shaped as a sphere.

4. The animal litter mixture of claim 1, wherein the silica gel includes at least some indicator silica gel that changes color to indicate water saturation.

5. The animal litter mixture of claim 1,
   wherein the compressed wood is cylindrical in shape.

* * * * *